US00RE37190E

(19) United States
(12) Reissued Patent
Stowell et al.

(10) Patent Number: US RE37,190 E
(45) **Date of Reissued Patent: *May 29, 2001**

(54) UNIVERSAL HANDLE FOR HAND-HELD IMPLEMENT

(75) Inventors: Davin Stowell, New York, NY (US); Michael Callahan, Dunwoody, GA (US)

(73) Assignee: General Housewares Corp., Elmira, NY (US)

( * ) Notice: This patent issued on a continued prosecution application filed under 37 CFR 1.53(d), and is subject to the twenty year patent term provisions of 35 U.S.C. 154(a)(2).

(21) Appl. No.: 07/985,918

(22) Filed: Dec. 4, 1992

Related U.S. Patent Documents

Reissue of:
(64) Patent No.: Re. 34,194
Issued: Mar. 16, 1993
Appl. No.: 07/710,466
Filed: Jun. 5, 1991
Which Is a Reissue of:
(64) Patent No.: 4,974,286
Issued: Dec. 4, 1990
Appl. No.: 07/498,729
Filed: Mar. 26, 1990

U.S. Applications:

(63) Continuation of application No. 07/710,466, filed on Jun. 5, 1991, now Pat. No. Re. 34,194.

(51) Int. Cl.[7] ..... B25G 1/00
(52) U.S. Cl. ..... 16/422; 16/110.1; 16/431; 16/DIG. 12; 16/430; 74/551.9; D8/303; 81/489; 81/177.1; 473/549
(58) Field of Search ..... 16/110 R, 110 A, 16/111 R, 111 A, 114 R, 116 R, 118, DIG. 12, DIG. 19, 110.1, 421, 422, 430; 74/551.9; 273/75, 81 B, 81 C, 81 D, 81 R, 73 J; 81/177.1, 177.85, 489; 15/143 R, 145, 176.1, 176.6, 143.1, 167.1; D4/104, 138; D7/395; D8/303, 313, 315, 322, DIG. 6, DIG. 8

(56) References Cited

U.S. PATENT DOCUMENTS

| | | |
|---|---|---|
| D. 76,552 | 10/1928 | Reynolds . |
| D. 118,401 | 1/1940 | Zimmer . |
| D. 152,155 | 12/1948 | Jacoff . |

(List continued on next page.)

FOREIGN PATENT DOCUMENTS

| | | | |
|---|---|---|---|
| 628656 | 10/1961 | (CA) . | |
| 825778 | 12/1951 | (DE) | 16/116 R |
| 2612683 | 9/1977 | (DE) . | |

(List continued on next page.)

OTHER PUBLICATIONS

WIPO 86/02849, published May 22, 1986, inventor—O'Dette.

*Primary Examiner*—Anthony Knight
*Assistant Examiner*—Donald M. Gurley
(74) *Attorney, Agent, or Firm*—Seyfarth Shaw

(57) ABSTRACT

A universal handle for household and other hand-held implements, the handle being adapted to ergonomically render the implement to which it is applied useable by individuals who have difficulty in firmly grasping a conventional handle. The universal handle, which is fabricated of elastomeric material having good thermal insulation and cushioning properties, includes an internal cavity to socket the core shank of the implement. The handle has an elliptical cross section, the opposing sides of the handle adjacent its upper end each having a concave depression, in each of which an array of spaced, flexible fins is anchored to define a depressible grip site. When the fingers of a user's hand are clenched about the handle, the internal region of the resultant fist conforms to the form of the handle to provide a good grip thereon, the thumb and forefinger pressing into the grip sites to enhance the user's grip on the handle.

12 Claims, 2 Drawing Sheets

U.S. PATENT DOCUMENTS

| | | | | |
|---|---|---|---|---|
| D. 185,613 | | 6/1959 | Price . | |
| D. 187,285 | | 2/1960 | Yearley et al. . | |
| D. 201,253 | | 6/1965 | Munson et al. . | |
| D. 245,064 | | 7/1977 | Petty . | |
| D. 257,192 | | 10/1980 | Moses . | |
| D. 265,163 | | 6/1982 | Steiner . | |
| D. 273,268 | | 4/1984 | Smith . | |
| D. 275,932 | | 10/1984 | Himbert et al. . | |
| D. 314,700 | | 2/1991 | Lurkis | D8/303 |
| D. 328,977 | | 9/1992 | Halm . | |
| D. 332,034 | * | 12/1992 | Viemeister . | |
| 1,469,766 | | 10/1923 | Blair . | |
| 1,618,640 | | 2/1927 | Dawson . | |
| 1,712,484 | | 4/1929 | Thompson . | |
| 1,898,690 | | 2/1933 | Schacht . | |
| 2,091,458 | | 8/1937 | Sleight . | |
| 2,094,240 | | 9/1937 | Herrick . | |
| 2,222,388 | | 11/1940 | Zimmer . | |
| 2,274,817 | | 3/1942 | Zimmer . | |
| 2,280,382 | | 4/1942 | Davis . | |
| 2,328,366 | | 8/1943 | Timmermann | 273/75 |
| 2,404,671 | * | 7/1946 | Vinal | 15/143.1 |
| 2,431,808 | | 12/1947 | Kluit . | |
| 2,466,502 | | 4/1949 | Stiller . | |
| 2,520,355 | | 8/1950 | Bell . | |
| 2,655,963 | | 10/1953 | Dell | 16/116 R |
| 2,666,340 | | 1/1954 | Hunt . | |
| 2,813,278 | | 11/1957 | Stecher . | |
| 3,072,938 | * | 1/1963 | Phaneuf | 15/176.6 |
| 3,185,001 | | 5/1965 | Viator . | |
| 3,216,052 | | 11/1965 | Hill | 16/116 R |
| 3,266,081 | | 8/1966 | Heim . | |
| 3,271,856 | | 9/1966 | Rowley . | |
| 3,371,367 | | 3/1968 | Tigerman . | |
| 3,438,413 | | 4/1969 | Borah . | |
| 3,848,871 | | 11/1974 | Sweet et al. | 74/551.9 |
| 3,872,572 | | 3/1975 | Hahn . | |
| 3,915,782 | | 10/1975 | Davis et al. | 16/110 R |
| 4,091,497 | | 5/1978 | Bade | 16/110 R |
| 4,184,248 | | 1/1980 | Wolfe . | |
| 4,197,611 | | 4/1980 | Bell et al. | 16/116 R |
| 4,327,465 | | 5/1982 | Moritsch . | |
| 4,330,937 | | 5/1982 | Cope . | |
| 4,331,193 | | 5/1982 | Tudisco . | |
| 4,372,361 | | 2/1983 | Whiteford . | |
| 4,416,166 | | 11/1983 | Jannard et al. . | |
| 4,452,289 | | 6/1984 | Smith | 74/551.9 |
| 4,476,742 | | 10/1984 | Midgley . | |
| 4,488,460 | | 12/1984 | Ballone et al. . | |
| 4,524,514 | | 6/1985 | Mallalieu et al. | 16/111 R |
| 4,593,899 | | 6/1986 | Miller | 16/110 R |
| 4,633,741 | | 1/1987 | Yang . | |
| 4,721,021 | | 1/1988 | Kusznir . | |
| 4,739,536 | | 4/1988 | Bandera et al. | 16/111 R |
| 4,773,281 | | 9/1988 | DiIoia | 74/558.5 |
| 4,825,552 | | 5/1989 | Bendickson et al. . | |
| 4,828,261 | | 5/1989 | Kleylein | 273/73 J |
| 4,844,252 | | 7/1989 | Barron et al. . | |
| 4,893,519 | | 1/1990 | Corso et al. | 74/551.9 |
| 4,941,232 | | 7/1990 | Decker et al. | 16/114 R |
| 4,951,533 | | 8/1990 | Hillinger . | |
| 4,953,862 | | 9/1990 | Uke et al. | 81/177.1 |
| 4,969,231 | | 11/1990 | Mader et al. . | |
| 4,986,147 | | 1/1991 | Cooper | 16/116 R |
| 5,027,511 | | 7/1991 | Miller | 16/110 R |
| 5,042,804 | | 8/1991 | Uke et al. . | |
| 5,052,071 | | 10/1991 | Halm . | |
| 5,056,381 | | 10/1991 | Carmein | 16/110 R |
| 5,097,566 | | 3/1992 | Decker et al. . | |
| 5,253,948 | * | 10/1993 | Butler | 15/176.6 |

FOREIGN PATENT DOCUMENTS

| | | | |
|---|---|---|---|
| 2726718 | 12/1978 | (DE) . | |
| 2800796 | 7/1979 | (DE) . | |
| 2810418A1 | 10/1979 | (DE) . | |
| 2840429A1 | 4/1980 | (DE) . | |
| 2935806 | 4/1981 | (DE) | 81/177.1 |
| 3019734 | 12/1981 | (DE) . | |
| 2842035 | 4/1986 | (DE) . | |
| 8708864 | 8/1987 | (DE) . | |
| 8808942 | 9/1988 | (DE) . | |
| 3828981A1 | 4/1989 | (DE) . | |
| 90256 | 10/1983 | (EP) . | |
| 0159453 | 4/1984 | (EP) . | |
| 2366106 | 4/1978 | (FR) . | |
| 2515561 | 5/1983 | (FR) . | |
| 422254 | 1/1935 | (GB) | 16/110 A |
| 1569924 | 5/1978 | (GB) . | |
| 2208156 | 6/1988 | (GB) . | |
| 8200265 | 2/1982 | (WO) . | |
| 8904619 | 6/1989 | (WO) . | |

* cited by examiner

Fig. 1.
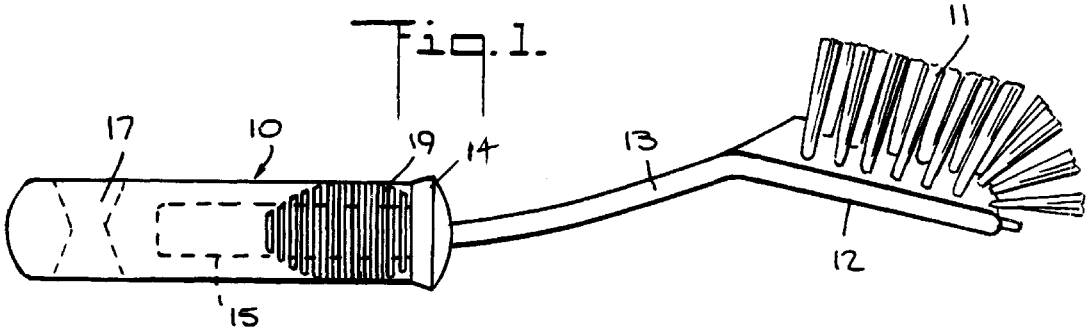
Fig. 2.
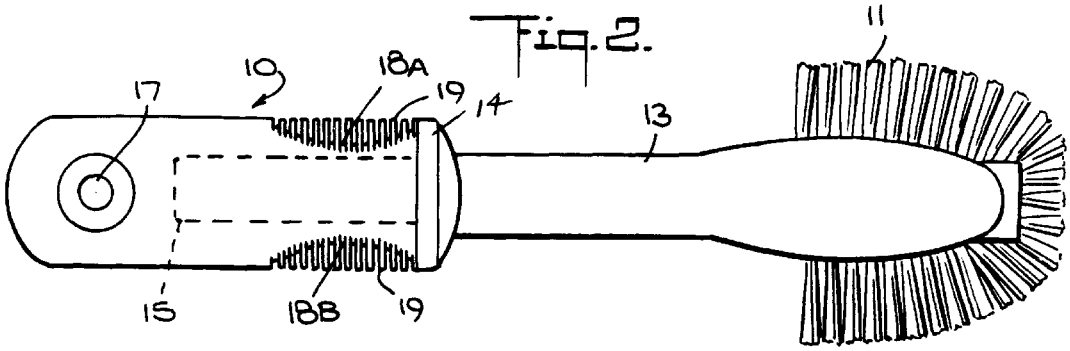
Fig. 3.
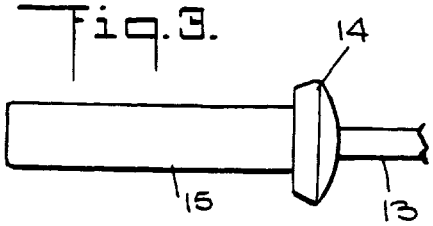
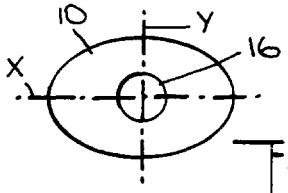
Fig. 4.
Fig. 5.
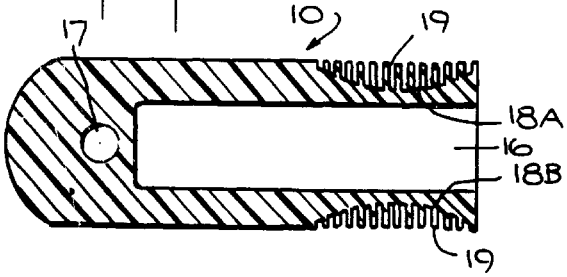
Fig. 6.
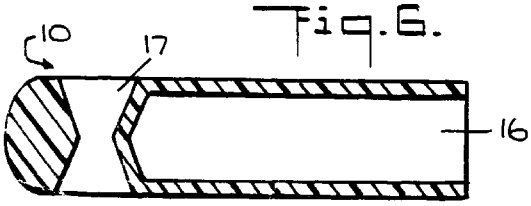
Fig. 7.
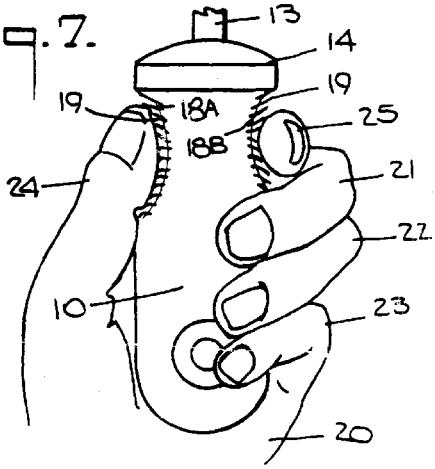

30

UNIVERSAL HANDLE FOR HAND-HELD IMPLEMENT

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

This application is a reissue of, and a continuation of, application Ser. No. 07/710,466, filed Jun. 5, 1991, now U.S. Pat. No. Re. 34,194, which is a reissue of U.S. Pat. No. 4,974,286.

BACKGROUND OF INVENTION

1. Field of Invention:

This invention relates generally to household and other hand-held implements which to be used effectively must be securely grasped by the user, and more particularly to a universal handle applicable to such implements to ergonomically render them usable by individuals who, because of physical or other disabilities have difficulty in firmly grasping a conventional implement handle.

2. Status of Prior Art:

Human factors engineering or ergonomics is an applied science that deals with the interaction between machines or tools and their users, taking into the account the capabilities or limitations of these individuals. It seeks to insure that the nature of the tool or machine is such that is effectively matched to the physical and cognitive abilities of the user to manipulate it.

Human factors engineering comes into play in the design of cockpits, control handles, seats and other objects which must be accommodated by the size, strength and shape of the user. Thus in designing the handle for a tea kettle, the designer must bear in mind that when the kettle is put to use, it will contain boiling water, and it is important, therefore, that the configuration of the handle and the material of which it is made be such as not only to afford a firm grip, but that it also thermally insulate the hand of the user from the kettle.

While typical household implements such as ladles, potato peelers, bottle openers and cheese knives have handles of metal, plastic or wood, little attention has heretofore been paid to human factors engineering; for whether in flat or round form, or in any other configuration, these handles are normally not difficult to grasp when the user is reasonably strong and his hands are free of impairment. Hence in the past, far greater attention has been paid to the ornamental or aesthetic features of handle design than to its ergonomic aspects.

But in the modern world in which senior citizens represent a substantial portion of the adult population, one is faced with many users of household or other hand-held implements who are advanced in years or physically weak, or who suffer from an arthritic or other condition that makes the simple act of clenching the fingers to form a tight fist difficult and painful. And should the user who has difficulty in forming a fist grasp an implement handle but fail to grip it securely, then the implement can slip from his hand, and in some cases this may have serious consequences.

SUMMARY OF INVENTION

In view of the foregoing, the main object of this invention is to provide a universal handle that is ergonomically adapted to render hand-held implements usable by individuals who are incapable of firmly grasping a conventional handle.

A significant feature of a handle in accordance with the invention is that it is relatively stocky, so that a user who has difficulty in making a tight fist can make enough of a fist in clenching the handle with his fingers to firmly engage the handle. Also an advantage of the handle, which is fabricated of elastomeric material, is that is has both cushioning and thermal insulation properties, thereby minimizing any pain that may be experienced in grasping the handle and at the same time thermally isolating the hand of the user from the implement.

More particularly, an object of this invention is to provide a universal handle having an elliptical cross section to create a stocky handle form that conforms to the internal region of the user's fist when the fingers of the hand are clenched about the handle, whereby the handle can be securely gripped.

Also an object of the invention is to provide an elastomeric handle of the above type having depressible grip sites that are engaged by the thumb and forefinger of the user's hand to enhance the gripping action.

Still another object of the invention is to provide a universal handle that may be mass produced at relatively low cost.

Briefly stated, these objects are attained in a universal handle for household and other hand-held implements, the handle being adapted to ergonomically render the implement to which it is applied usable by individuals who have difficulty in firmly grasping a conventional handle. The universal handle, which is fabricated of elastomeric material having good thermal insulation and cushioning properties, includes an internal cavity to socket the core shank of the implement. The handle has an elliptical cross section, the opposing sides of the handle adjacent its upper end each having a concave depression, in each of which an array of spaced, flexible fins is anchored to define a depressible grip site. When the fingers of a user's hand are clenched about the handle, the internal region of the resultant fist conforms to the form of the handle to provide a good grip thereon, the thumb and forefinger pressing into the grip sites to enhance the user's grip on the handle.

BRIEF DESCRIPTION OF DRAWINGS

For a better understanding of the invention, reference is made to the following detailed description to be read in conjunction with the accompanying drawings, wherein:

FIG. 1 is a side view of an implement serving as a pot brush, the implement including a universal handle in accordance with the invention;

FIG. 2 is a bottom view of this implement;

FIG. 3 separately shows the core shank of the implement which is socketed in the universal handle;

FIG. 4 is an end view of the handle which has an elliptical cross section having a long and a short axis;

FIG. 5 is a longitudinal section taken through the long axis of the handle;

FIG. 6 is a longitudinal section taken through the short arc of the handle;

FIG. 7 illustrates how the handle is grasped by a user;

DESCRIPTION OF INVENTION

Figure 8:
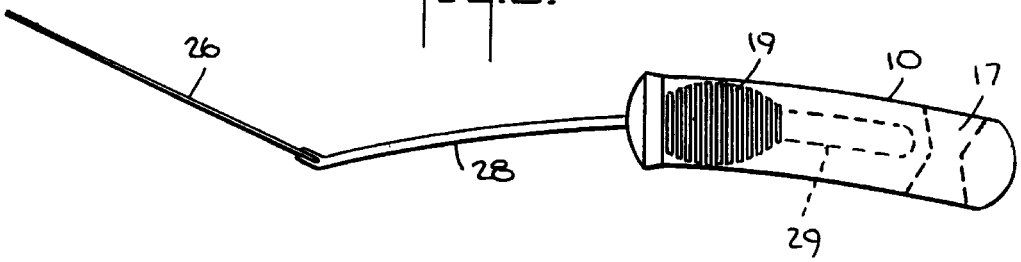
FIG. 8 is a side view of a spatula provided with a universal handle in accordance with the invention.

A universal handle in accordance with the invention is applicable to any hand-held tool or implement that includes a core shank that can be socketed in the handle. Hence though the universal handle will, by way of example, be illustrated as applied to a pot brush, a spatula and a spoon, it is to be understood that the handle is by no means limited to these implements but may be applied to various hand-held tools and implements such as hammers and screwdrivers, garden tools, such as spades, and various kinds of handled household implement such as bottle openers, kitchen knives, potato peelers and cheese knives.

Referring now to FIGS. 1 and 2, shown therein is a pot brush provided with a universal handle in accordance with the invention, generally identified by reference numeral 10. This implement includes an arcuate array of bristle clusters 11 formed of nylon filaments or similar material, the clusters being anchored in a synthetic plastic base 12 having an extension arm 13. Arm 13, as best seen in FIG. 3, is joined to the enlarged head 14 of a core shank 15, the shank being securely socketed in handle 10.

As best seen in FIG. 4, handle 10, which is formed of elastomeric material such as neoprene or synthetic rubber, has an elliptical cross section, the ellipse having a long axis X and a short axis Y that intersects axis X at the center line of the handle. The handle is stocky, and its dimensions are related to those of the typical adult handle, so that when the handle is clenched by the fingers of the hand, the resultant fist has an internal region that conforms to the contours of the handle.

The nature of jointed fingers are such that when one makes a tight fist, there is then no internal region or open space, but when the fist embraces a stocky handle, the internal region has a generally elliptical cross section that conforms to the form of the handle.

Handle 10 is provided with an internal cavity 16 that extends longitudinally along the center line of the handle. The dimensions of this cavity substantially match those of extension arm 13 inserted therein, so as to securely socket the shank in the cavity. When so socketed, the enlarged head 14 of the shank, which has an elliptical cross section, matches that of the handle. Head 14 abuts the flat end of the handle and is bonded thereto by a suitable epoxy or other bonding agent.

Adjacent the lower end of the handle is an opening 17 whose geometric form, as best seen in FIG. 6, is that of a pair of truncated cones. This opening makes it possible to suspend the handle from a hook, or to grasp the handle between the thumb and forefinger which enter the opposing truncated cones, so that the user can, if necessary, pull on the handle or otherwise manipulate it. It is sometimes useful to be able to so grip the handle of an implement, rather than to clench the body of the handle.

Formed in opposing sides of handle 10 adjacent its upper end are concave depressions 18A and 18B, whose outlines are best seen in FIGS. 2 and 5. The periphery of these concave depressions are elliptical in shape to generally conform to the tips of the thumb and forefinger.

Anchored in each concave depression is an array of equi-spaced fins 19. Because the handle is formed of elastomeric material, fins 19 are highly flexible. The array of fins forms a grip site whereby when the fins are pressed in by the forefinger and thumb of a user's hand, this action enhances the user's grip on the handle.

When, therefore, as shown in FIG. 7, a user grasps handle 10 with the fingers of his hand 20, the handle is then nested within the palm of the hand. Fingers 21, 22 and 23 are then clenched about the handle to form an open fist whose internal cavity matches the elliptical form of the handle. The forefinger 24 is pressed into the grip site on one side of the handle, while the thumb 25 is pressed in the grip site on the opposing side to enhance the user's grip on the handle.

Hence even if the user is incapable or has difficulty in making a tight fist, he nevertheless gains a good grip on the universal handle which is further enhanced by the grip sites.

Figure 9:
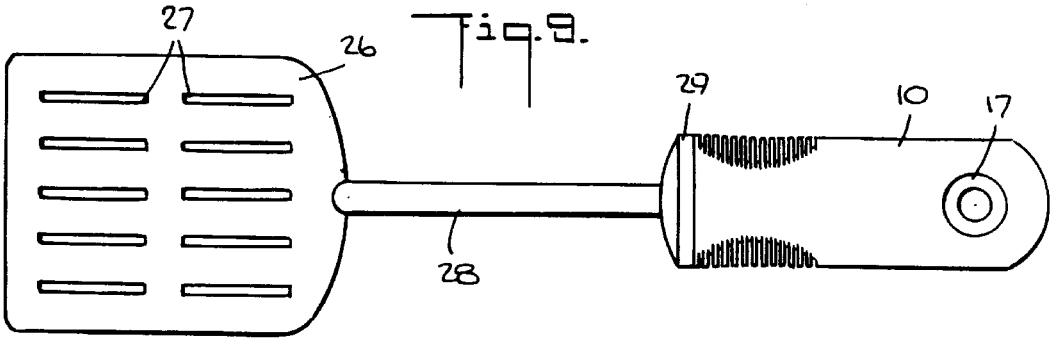
FIG. 9 is a top view of the spatula.

FIGS. 8 and 9 show an implement in the form of a spatula having a flat blade 26 provided with an array of slots 27, the blade being cantilevered from an extension arm 28 terminating in the head 29 of a core shank 30 that is socketed in a universal handle 10 in accordance with the invention. In this instance, core shank 30 is somewhat curved, so that the handle, which is of elastomeric material, assumes a curvature conforming to that of the curved shank.

Figure 10:
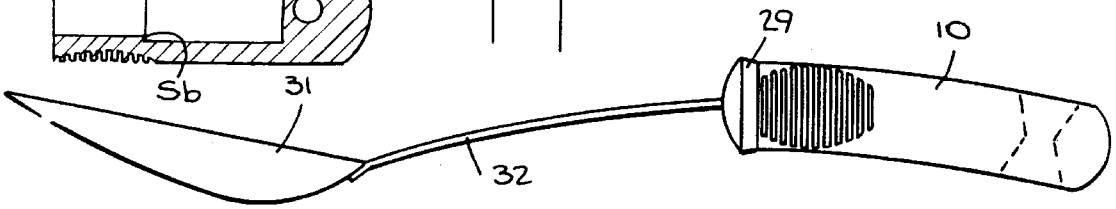
FIG. 10 is a side view of a spoon provided with a universal handle according to the invention.
Figure 11:
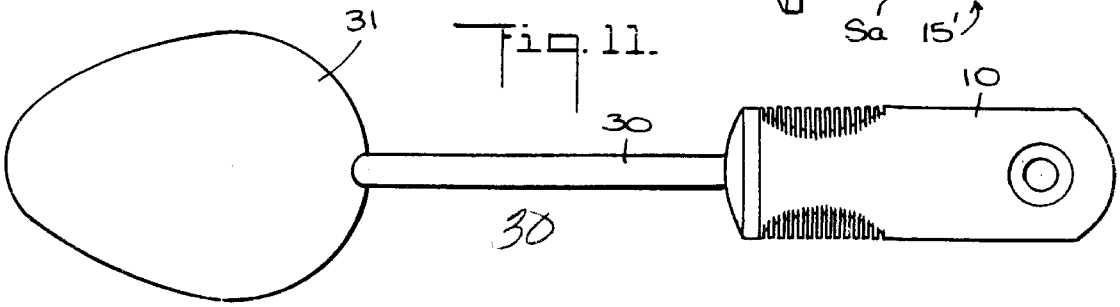
FIG. 11 is a top view of the spoon.

In the spoon 31 shown in FIGS. 10 and 11, the spoon is cantilevered from an arm 32 that terminates in the head of a core shank that is curved, as in the spatula shown in FIG. 8 so that again the handle is curved.

In one practical embodiment, the handle has a length of 3¾ inches, a width of 1⅜ inches, and a thickness of ⅓ of an inch, so that it is relatively stocky.

The universal handle not only affords a good grip on the implement, but because it is of elastomeric material, it acts to cushion the hand of the user to minimize any pain that might be experienced in handling the implement. Such material, unlike hard plastic or metal, has non-slip characteristics, so that the fingers clenching the handle even when the grip is weak, do not slide on the surface of the handle.

And because the elastomeric material is a poor conductor of heat, the handle thermally isolates the hands of the user from the metal blade or other working component of the implement.

Modified Handle and Core Shank

In the arrangements shown in the previous figures, the core shank 15 of the implement is of uniform diameter, and the core shank is snugly socketed in the internal cavity of the elastomeric handle 10 which has a cylindrical cross section. Hence to insure that the handle cannot be pulled off the core shank, it may be necessary to bond the shank to the handle.

Figure 13:
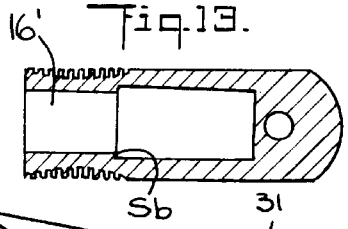
FIG. 13 shows a modified handle in accordance with the invention which complements the core shank shown in FIG. 12.
Figure 12:
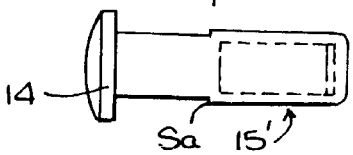
FIG. 12 shows a modified core shank in accordance with the invention for an implement.

To avoid the need for a bonding agent, the core shank 15', as shown in FIG. 12, has a cylindrical upper section whose diameter is slightly smaller than the diameter of the lower section to define a shoulder or step $S_a$ at the junction of these sections. And, as shown in FIG. 13, the cylindrical cavity 16' in handle 10 has a section whose diameter is slightly smaller than the diameter of the lower section to define a reverse step $S_b$.

Hence when the core shank 15 of the implement is forced into cavity 16' of the elastomeric handle 10, then the lower section of the core shank is nested within the lower section of the cavity, and the upper section of the core shank is nested within the upper section of the cavity. The step $S_a$ and reverse step $S_b$ are then in abutting relation and serve to resist withdrawal of the handle.

Advantages

The elliptical cross section of a handle in accordance with the invention enhances the user's ability to control lateral rotation of the handled implement. Thus with a knife having a conventional round handle, it is difficult to rotate the edge of the knife when it meets resistance in the material being cut. But with a handle in accordance with the invention, the handle will not slip in the hand of the user when resistance to cutting is encountered.

The length of the handle in accordance with the invention and the rounded shape of its end are such that the end fits in the palm of the user's hand and the user can therefore comfortably apply a force in the longitudinal direction of the implement. This is of advantage when, for example, the implement is a fruit corer and is being pushed through an apple, or when the implement is a cleaning brush and has to be pushed into the corner of a pan or recess. The large hole in the handle makes its end somewhat more flexible, thereby providing for shock absorption when the implement is used in this fashion.

The conical hole in the handle also has the advantage of making it easier for a user whose hands are shaky and whose eyesight is failing, to guide the handle onto a supporting hook.

While there has been shown and described a preferred embodiment of a universal handle for hand-held implements in accordance with the invention, it will be appreciated that many changes and modifications may be made therein, without, however, departing from the essential spirit thereof.

We claim:

1. A universal handle for a household or other hand-held implement provided with a core shank, said handle comprising:

(a) a body formed of elastomeric material having an elliptical cross section, said body having an internal cavity to socket the shank *at a shank end of said body*;

(b) a pair of concave depressions formed in the body at opposing sides thereof adjacent [its upper end] *said shank end*; and (c) an array of spaced flexible fins [[anchored]] disposed only in each depression to define a grip site, each of said fins having a proximal end anchored in the associated depression and a free distal end and having a thickness substantially less than the maximum distance between the proximal and distal ends, whereby when a user clenches the handle with the fingers of his hand, the internal region in the resultant fist conforms to the shape of the handle to provide a good grip, the grip sites being pressed in by the forefinger and the thumb of the hand to enhance the grip.

2. A handle as set forth in claim 1, wherein said body is formed of an elastomeric material that has cushioning and thermal [[insulator]] insulation properties.

3. A handle as set forth in claim 1, wherein each concave depression has an elliptical periphery whose long axis is parallel to the longitudinal axis of the handle.

4. A handle as set forth in claim 1, further including an opening formed in the body adjacent [[its lower]] the end opposite said shank end, said opening being defined by opposing truncated cones.

*5. A universal handle for a household or other hand-held implement provided with a core shank, said handle comprising:*

(*a*) *a body having an elliptical cross section, said body having an internal cavity to socket the shank* at a shank end of said body;

(*b*) *a pair of concave depressions formed in the body at opposing sides thereof adjacent* [[*its upper*]] said shank *end; and*

(*c*) *an array of spaced flexible fins* [[*anchored*]] disposed only *in each depression to define a grip site*, each of said fins having a proximal end anchored in the associated depression and a free distal end and having a thickness substantially less than the maximum distance between the proximal and distal ends, *whereby when a user clenches the handle with the fingers of his hand, the internal region in the resultant fist conforms to the shape of the handle to provide a good grip, the grip sites being pressed in by the forefinger and the thumb of the hand to enhance the grip.*

6. A universal handle for a household or other hand-held implement, said handle comprising:

(a) a body;

(b) a pair of depressions formed in the body at opposing sides thereof adjacent one end thereof; and

(c) an array of spaced flexible fins disposed only in each depression to define a grip site, each of said fins having a proximal end anchored in the associated depression and a free distal end and having a thickness substantially less than the maximum distance between the proximal and distal ends, whereby when a user clenches the handle with the fingers of his hand, the internal region in the resultant fist conforms to the shape of the handle to provide a good grip, the grip sites being pressed in by the forefinger and the thumb of the hand to enhance the grip.

7. The handle of claim 6, wherein said body has an elliptical cross section.

8. The handle of claim 6 for use with a hand-held implement provided with a core shank, said body having an internal cavity to receive the shank.

9. The handle of claim 6, wherein said depressions are concave.

10. The handle of claim 6, wherein said body includes a portion adjacent to said one end thereof configured for joinder thereof to a household or other hand-held implement.

11. The handle of claim 6, wherein said body is formed of an elastomeric material.

12. The handle of claim 6, wherein said body has an outer surface, the depressions being formed in the outer surface of said body, each of said fins being configured such that its free distal end extends substantially to said outer surface of said body.

* * * * *

UNITED STATES PATENT AND TRADEMARK OFFICE

CERTIFICATE OF CORRECTION

PATENT NO. : RE 37,190 P2
DATED : May 29, 2001
INVENTOR(S) : Stowell et al.

It is certified that error appears in the above-identified patent and that said Letters Patent is hereby corrected as shown below:

Column 6,
Line 24 to 25, "6. A universal handle for a household or other hand-held implement, said handle comprising:" should be bolded text -- 6. A universal handle for a household or other hand-held implement, said handle comprising: --.

Signed and Sealed this

Eleventh Day of December, 2001

*Attest:*

Nicholas P. Godici

NICHOLAS P. GODICI
*Acting Director of the United States Patent and Trademark Office*

*Attesting Officer*